US012572171B2

(12) United States Patent
Tang et al.

(10) Patent No.: US 12,572,171 B2
(45) Date of Patent: Mar. 10, 2026

(54) HEAD-MOUNTED DEVICE AND AUGMENTED REALITY DEVICE

(71) Applicants:Fu Tai Hua Industry (Shenzhen) Co., Ltd., Shenzhen (CN); HON HAI PRECISION INDUSTRY CO., LTD., New Taipei (TW)

(72) Inventors: Hai-Ping Tang, Shenzhen (CN); Cheng-Ching Chien, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 193 days.

(21) Appl. No.: 18/541,162

(22) Filed: Dec. 15, 2023

(65) Prior Publication Data

US 2024/0118728 A1     Apr. 11, 2024

(30) Foreign Application Priority Data

Jan. 17, 2023    (CN) .......................... 202310095593.3

(51) Int. Cl.
*G06F 1/16* (2006.01)
*G02B 27/00* (2006.01)
*G02B 27/01* (2006.01)

(52) U.S. Cl.
CPC ......... *G06F 1/163* (2013.01); *G02B 27/0081* (2013.01); *G02B 27/0172* (2013.01); *G02B 27/0176* (2013.01)

(58) Field of Classification Search
CPC . G06F 1/163; G02B 27/0081; G02B 27/0172; G02B 27/0176; G02B 27/0149; G02B 27/017; G02B 2027/0154
See application file for complete search history.

(56) References Cited

U.S. PATENT DOCUMENTS

| | | | | |
|---|---|---|---|---|
| 4,198,114 A | * | 4/1980 | Zapp ................... | G02B 27/0176 359/376 |
| 5,739,893 A | * | 4/1998 | Karasawa .......... | G02B 27/0176 351/158 |

(Continued)

FOREIGN PATENT DOCUMENTS

| | | |
|---|---|---|
| JP | 9-281433 A | 10/1997 |
| JP | 2017-017565 A | 1/2017 |

(Continued)

*Primary Examiner* — Allen L Parker
*Assistant Examiner* — Martin Antonio Asmat Uceda
(74) *Attorney, Agent, or Firm* — ScienBiziP, P.C.

(57) ABSTRACT

A head-mounted device comprises a main body, a monitor-base, a monitor, and an adjusting component. The main body is mounted on a user's head. The monitor moves with the monitor-base. An eyes-monitor distance is defined between the user's eyes and the monitor. A visual range is defined by a range seen by the user's eyes through the monitor. The adjusting component is configured for pulling or pushing the monitor-base towards the user's eyes to prevent the eyes-monitor distance from increasing and to prevent the visual range from decreasing. When the user wears a pair of glasses between the user's eyes and the monitor, and the glasses block the monitor causing the eyes-monitor distance to be larger than a preset distance, the adjusting component pulls or pushes the monitor-base until the monitor contacts the glasses, to prevent the eyes-monitor distance from increasing. An augmented reality device is also disclosed.

13 Claims, 3 Drawing Sheets

(56)          References Cited

U.S. PATENT DOCUMENTS

| | | | | |
|---|---|---|---|---|
| 5,954,642 | A * | 9/1999 | Johnson | G02B 27/0176 |
| | | | | 600/300 |
| 10,045,449 | B1 * | 8/2018 | Yee | G02B 27/017 |
| 11,287,846 | B2 * | 3/2022 | Chen | G06F 3/011 |
| 11,415,802 | B2 * | 8/2022 | Shin | G02B 27/4205 |
| 12,111,689 | B2 * | 10/2024 | Andersen | G06F 1/163 |
| 12,117,618 | B2 * | 10/2024 | Homma | G02B 7/008 |
| 12,181,919 | B2 * | 12/2024 | Hatfield | G06F 3/011 |
| 2009/0135506 | A1 * | 5/2009 | Willey | G02B 27/0176 |
| | | | | 359/815 |
| 2012/0033142 | A1 * | 2/2012 | Thomson | G02B 27/0176 |
| | | | | 348/838 |
| 2013/0194682 | A1 * | 8/2013 | Sahu | G02B 27/022 |
| | | | | 359/804 |
| 2015/0219901 | A1 * | 8/2015 | Morimoto | G02B 27/0176 |
| | | | | 345/8 |
| 2017/0090851 | A1 * | 3/2017 | Takano | G09G 3/003 |
| 2018/0046147 | A1 * | 2/2018 | Aghara | G06F 3/012 |
| 2018/0059715 | A1 * | 3/2018 | Chen | G06F 1/1632 |
| 2018/0095497 | A1 * | 4/2018 | Hsu | A61F 9/06 |
| 2018/0164849 | A1 * | 6/2018 | Chan | A42B 3/042 |
| 2019/0227329 | A1 * | 7/2019 | Han | G02B 27/0179 |
| 2020/0050235 | A1 * | 2/2020 | Yoon | G06F 1/163 |
| 2021/0041706 | A1 * | 2/2021 | Hatfield | G06F 1/163 |
| 2023/0139609 | A1 * | 5/2023 | Huang | G02C 5/2209 |
| | | | | 345/8 |
| 2023/0205265 | A1 * | 6/2023 | Oka | G06F 1/163 |
| 2023/0266589 | A1 * | 8/2023 | Eaton | G06V 40/171 |
| | | | | 704/231 |
| 2024/0134207 | A1 * | 4/2024 | Zhang | G02B 27/0176 |
| 2025/0224625 | A1 * | 7/2025 | Rynk | G06V 40/18 |
| 2025/0251608 | A1 * | 8/2025 | Zhang | G02B 27/0176 |

FOREIGN PATENT DOCUMENTS

| | | | |
|---|---|---|---|
| JP | 2021-007254 A | 1/2021 | |
| JP | 2022-040920 A | 3/2022 | |

* cited by examiner

HEAD-MOUNTED DEVICE AND AUGMENTED REALITY DEVICE

FIELD

The disclosure herein generally relates to wearable display devices, and more particularly relates to a head-mounted device and an augmented reality device.

BACKGROUND

User can see a virtual image through a monitor of a head-mounted device, such as an augmented reality device. However, when the user puts on glasses, the glasses may block the monitor.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
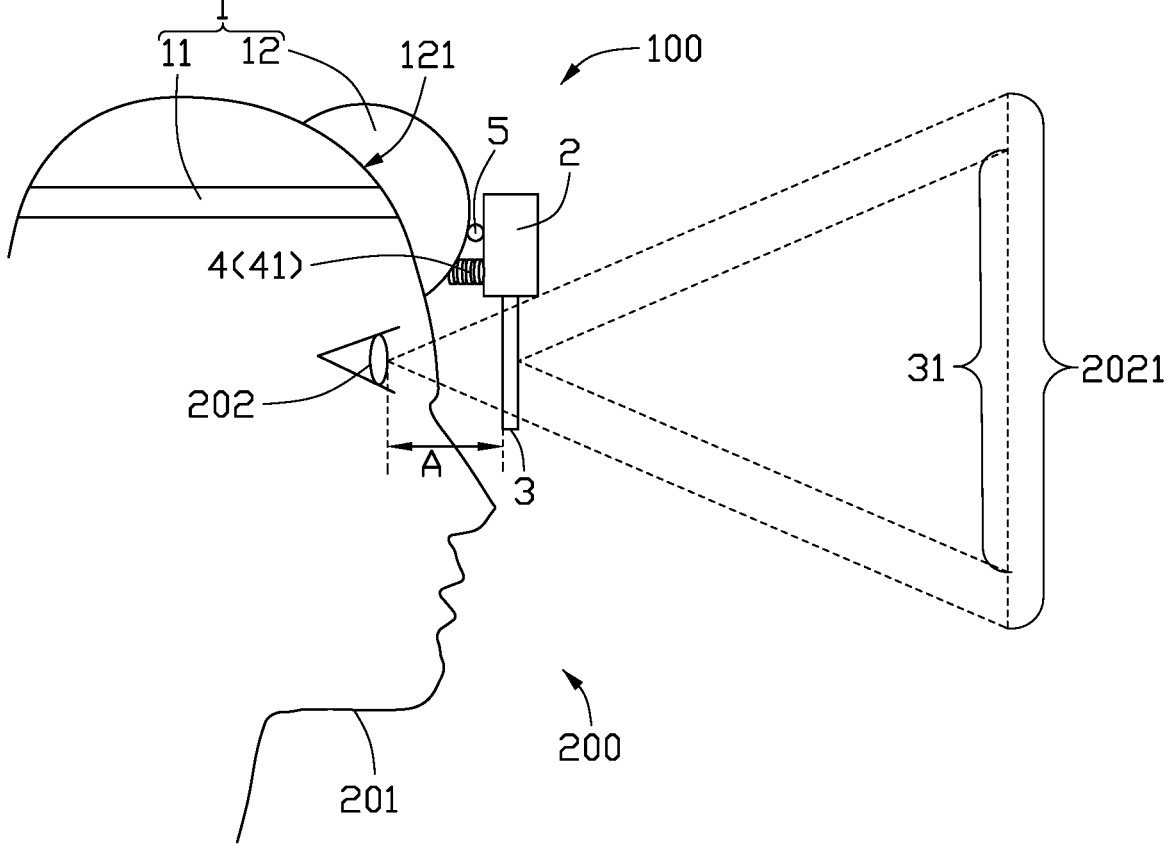
FIG. 1 is a diagram view illustrating a head-mounted device worn on the user's head according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, baffle structures, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "comprising" means "including, but not necessarily limited to;" it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

As shown in FIG. 1, a head-mounted device 100 in an embodiment includes a main body 1, a monitor-base 2, a monitor 3, and an adjusting component 4. The main body 1 can be worn on a head 201 of a user 200. The monitor-base 2 is movably mounted on the main body 1. The monitor 3 is mounted on the monitor-base 2. The monitor 3 can be moved with the monitor-base 2 relative to the main body 1. The monitor 3 is used for displaying a virtual image 31. The adjusting component 4 is mounted on the monitor-base 2. An eyes-monitor distance A is defined between the user's eyes 202 and the monitor 3. A visual range 2021 is defined by a range seen by the user's eyes 202 through the monitor 3, which means the visual range 2021 is the area that the user 200 sees through the monitor 3 in a certain distance. The adjusting component 4 is configured for moving the monitor-base 2 towards the user's eyes 202.

The user's eyes 202 see the virtual image 31 through the monitor 3. The adjusting component 4 moves the monitor-base 2 towards the head 201 of the user 200, so the monitor 3 cannot move away from the head 201, preventing the eyes-monitor distance A from increasing and preventing the visual range 2021 from decreasing. Thus, the ratio of the visual range 2021 to the virtual image 31 keep constant at the same distance, so that the virtual image 31 is all within the coverage of the visual range 2021, allowing the user 200 to see the entire virtual image 31.

In some embodiments, the virtual image 31 includes, but is not limited to, AR (Augmented Reality) virtual image, VR (Virtual Reality) virtual image, or MR (Mixed Reality) virtual image.

Figure 2:
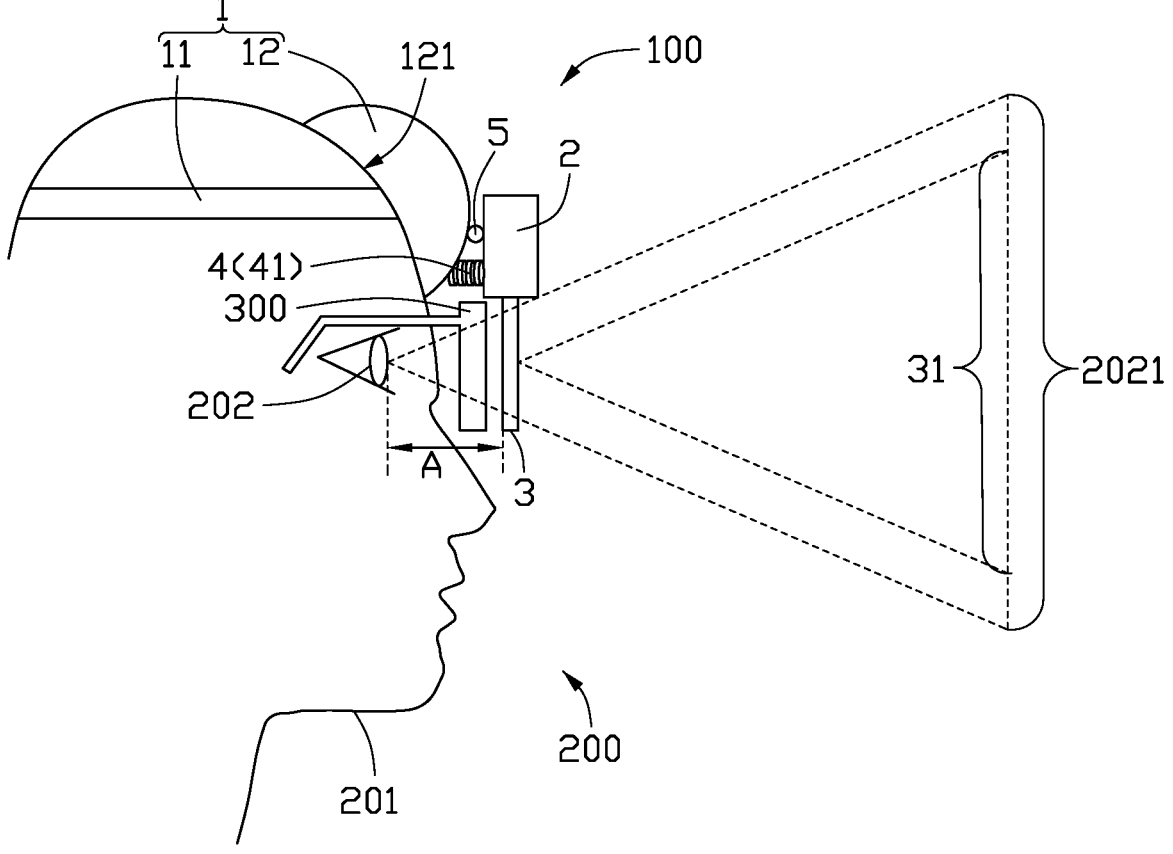
FIG. 2 is a diagram view illustrating the head-mounted device in FIG. 1 when the item does not block a monitor.
Figure 3:
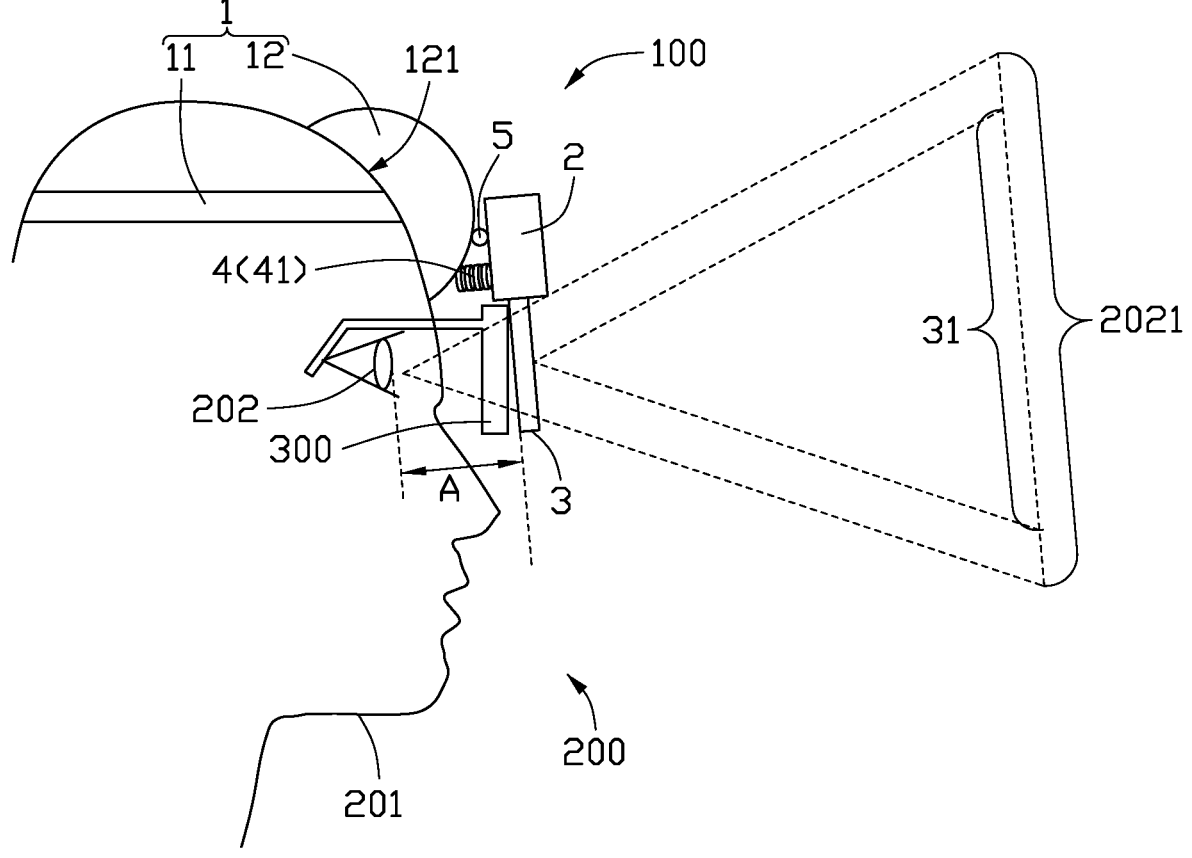
FIG. 3 is a diagram view illustrating the head-mounted device in FIG. 2 when the item blocks the monitor.

As shown in FIG. 1 to FIG. 3, in some embodiments, a preset distance is defined between the user's eyes 202 and the monitor 3. The preset distance is a preset value in the program of the head-mounted device 100. When the eyes-monitor distance A is equal to the preset distance, the monitor 3 is located on a preset position, and the visual range 2021 can cover the whole virtual image 31. For the same virtual image 31 displayed by the same head-mounted device 100, the position and size of the virtual image 31 relative to the monitor 3 are fixed. For the same monitor 3, the position of the monitor 3 relative to the eyes 202 is fixed, the movement range of the eyes 202 is fixed, so the visual range 2021 is fixed. If the sight of the eyes 202 exceeds the range of monitor 3, the sight of the eyes 202 will be outside the monitor 3, then the sight of the eyes 202 is outside the visual range 2021, so the user 200 cannot see the whole virtual image 31. If the user 200 wears an item 300 in front of the eyes 202, or because different users 200 have different head shapes, or because the connection stability between the monitor 3 and the main body 1 is poor, etc., the eyes-monitor distance A may be larger than the preset distance, causing the visual range 2021 to tend to be smaller. Therefore, it is necessary to avoid the eyes-monitor distance A from increasing, otherwise the visual range 2021 cannot be able to cover the virtual image 31.

In some embodiments, as shown in FIG. 3, when the user 200 wears the item 300 between the user's eyes 202 and the monitor 3, and the item 300 blocks the monitor 3 causing the eyes-monitor distance A to be larger than the preset distance, the adjusting component 4 moves the monitor-base 2 towards the user's eyes 202, so that the monitor 3 contacts the item 300, to prevent the eyes-monitor distance A from increasing. As shown in FIG. 2, when the user 200 wears the item 300 between the user's eyes 202 and the monitor 3 but the item 300 does not block the monitor 3, which makes that the eyes-monitor distance A can be equal to the preset distance, the adjusting component 4 keeps the monitor-base 2 staying in a natural state relative to the main body 1, allowing the eyes-monitor distance A to keep equal to the preset distance, preventing the eyes-monitor distance A from increasing. As shown in FIG. 1, when the user 200 wears nothing between the user's eyes 202 and the monitor 3, the adjusting component 4 keeps the monitor-base 2 staying in a natural state relative to the main body 1, allowing the eyes-monitor distance A to keep equal to the preset distance, preventing the eyes-monitor distance A from increasing. If the item 300 is worn in front of the user's eyes 202 and interferes with the monitor 3, causing the eyes-monitor distance A to be greater than the preset distance, then adjusting component 4 pulls or pushes the monitor-base 2 until the monitor 3 contacts the item 300, so the monitor 3 stays as close as possible to the user's eyes 202, preventing the eyes-monitor distance A from increasing and keeping the visual range 2021 at the maximum range, to allow the user to see the entire virtual image 31. If the item 300 worn before the user's eyes 202 does not interfere the monitor 3, or the item 300 is not worn before the user's eyes 202, the eyes-monitor distance A can be equal to the preset distance, then the adjusting component 4 keeps the monitor-base 2 staying in a natural state to fix the monitor 3 relative to the main body 1, to make the monitor 3 fix relative to the user's eyes 202, so eyes-monitor distance A cannot become larger, so that the user's eyes 202 can see the entire virtual image 31.

In some embodiments, the adjusting component 4 is an elastic member 41. The elastic member 41 comprises two ends, one end of the elastic member 41 is connected to the main body 1, and another end of the elastic member 41 is connected to the monitor-base 2. As shown in FIG. 3, when the user 200 wears the item 300 between the user's eyes 202 and the monitor 3, and the item 300 blocks the monitor 3 causing the eyes-monitor distance A to be larger than the preset distance, the elastic member 41 pulls or pushes the monitor-base 2 towards the user's eyes 202, so that the monitor 3 contacts the item 300, to prevent the eyes-monitor distance A from increasing. As shown in FIG. 2, when the user 200 wears the item 300 between the user's eyes 202 and the monitor 3 but the item 300 does not block the monitor 3, which makes that the eyes-monitor distance A can be equal to the preset distance, the elastic member 41 stays in a natural state, allowing the eyes-monitor distance A to keep equal to the preset distance. As shown in FIG. 1, when the user 200 wears nothing between the user's eyes 202 and the monitor 3, the elastic member 41 stays in a natural state, allowing the eyes-monitor distance A to keep equal to the preset distance. If the item 300 is worn in front of the user's eyes 202 and interferes with the monitor 3, causing the eyes-monitor distance A to be greater than the preset distance, then the elastic member 41 pulls or pushes the monitor-base 2 until the monitor 3 contacts the item 300, so the monitor 3 stays as close as possible to the user's eyes 202, preventing the eyes-monitor distance A from increasing and keeping the visual range 2021 at the maximum range, to allow the user to see the entire virtual image 31. If the item 300 worn before the user's eyes 202 does not interfere the monitor 3, or the item 300 is not worn before the user's eyes 202, the eyes-monitor distance A can be equal to the preset distance, then the elastic member 41 keeps the monitor-base 2 staying in a natural state to fix the monitor 3 relative to the main body 1, to make the monitor 3 fix relative to the user's eyes 202, so the eyes-monitor distance A cannot become larger, so that the user's eyes 202 can see the entire virtual image 31.

The elastic member 41 generates elastic force through elastic deformation. According to the elongation or shortening length of the elastic member 41, the magnitude of the elastic force will change on its own. Therefore, when the eyes-monitor distance A is equal to the preset distance, the elastic force of the elastic member 41 is zero, and the greater the eyes-monitor distance A is than the preset distance, the greater the elastic force of the elastic member 41 becomes. The user 200 does not need to manually adjust the elastic member 41, so that the monitor 3 moves automatically, making the eyes-monitor distance A equal to the preset distance, or the monitor 3 stays as close as possible to the position of eyes-monitor distance A, preventing the visual range 2021 from decreasing.

As shown in FIG. 1 to FIG. 3, in some embodiments, the elastic member 41 is a spring. The spring resets itself to the initial length by extending or shortening, thereby exerting elastic force on the monitor-base 2 and driving the monitor-base 2 to move while the spring resets itself. The initial length of the spring can be changed to adapt to different preset distances. For example, the elastic member 41 is a tension spring, and the tension spring is located on a side of the monitor-base 2 facing the user 200. For another example, the elastic member 41 is a compression spring, and the compression spring is located on a side of the monitor-base 2 opposite to the user 200. In some other embodiments, the elastic member 41 can be a rubber piece, an elastic cord, or other components capable of elastic deformation.

As shown in FIG. 2 and FIG. 3, in some embodiments, the item 300 is a pair of glasses, and the glasses can be a pair of myopia glasses, a pair of hyperopia glasses, a pair of reading glasses, a pair of astigmatism glasses or a pair of flat glasses. Since different users 200 have different needs, they need to wear different glasses so that the user 200 can clearly see the virtual image 31 provided by the monitor 3. Therefore, the pair of glasses will be worn between the monitor 3 and the eyes 202, which affects the monitor 3 when the monitor 3 moves to the position where the eyes-monitor distance A is equal to the preset distance. In other embodiments, the item 300 can be medical supplies such as bandages, eye accessories such as eye masks, or other components that need to be worn in front of eyes 202 when using head-mounted device 100.

In some embodiments, the adjusting component 4 is a cylinder. The cylinder has an adjustable-sized cavity. After the volume of the cavity is changed, the cavity will return to its initial state under the action of atmospheric pressure, thus providing force to move the monitor-base 2. In some other embodiments, the adjusting component 4 is something else, as long as it can automatically adjust the monitor-base 2.

As shown in FIG. 1 to FIG. 3, in some embodiments, the head-mounted device 100 further includes a rotating shaft 5. The monitor-base 2 is connected to the main body 1 through the rotating shaft 5. The monitor-base 2 is rotatable relative to the main body 1, and the monitor-base 2 rotates to adjust the eyes-monitor distance A. When the adjusting component 4 pulls or pushes the monitor-base 2, the monitor-base 2 rotates relative to the main body 1, and the monitor 3 rotates with the monitor-base 2 relative to the main body 1. Since the main body 1 is fixed relative to the user's eyes 202, the monitor 3 moves closer to the eyes 202 after rotating, which can change the eyes-monitor distance A to make the visual range 2021 become larger, allowing the user 200 to see the entire virtual image 31.

Due to the rotational connection between the monitor-base 2 and the main body 1, the friction of the monitor-base 2 is rolling friction, which is smaller and makes it easier for the adjusting component 4 to rotate the monitor-base 2.

As shown in FIG. 1 to FIG. 3, in some embodiments, there is only one monitor-base 2 and the monitor-base 2 has two monitors 3. The two monitors 3 are used to display the virtual image 31 respectively to the two eyes 202 of the user 200. When the monitor-base 2 rotates, the corresponding eyes-monitor distance A of the two monitors 3 is equal. The one monitor-base 2 drives the two monitors 3 to move at the same time, so that the distances between the two monitors 3 and their corresponding eyes 202 change synchronously, and the eyes-monitor distance A corresponding to the two eyes 202 is kept equal. Thus, the two eyes 202 always see the same range of virtual image 31, avoiding the situation where one eye 202 can see the entire virtual image 31 but another eye 202 cannot see the entire virtual image 31.

As shown in FIG. 1 to FIG. 3, in some embodiments, the elastic member 41 is a tension spring, and the tension spring is located on a side of the monitor-base 2 facing the user 200. The force application point of the adjusting component 4 on the monitor-base 2 and the monitor 3 are on the same side of the rotating shaft 5. The force application point of the adjusting component 4 on the monitor-base 2 is between the rotating shaft 5 and the monitor 3. It not only reduces the size of the monitor-base 2, but also prevents the monitor-base 2 from extending in the opposite direction relative to the monitor 3, making assembly easier. For example, when the user 200 wears the head-mounted device 100, the force application point of the adjusting component 4 on the monitor-base 2 is lower than the rotating shaft 5 and higher than the monitor 3 in the vertical direction.

In some embodiments, the head-mounted device 100 further includes a rail and a slider, either one of the rail and the slider is located in the main body 1, and another one of the rail and the slider is located in the monitor-base 2. The slider is mounted on the rail, so that the monitor-base 2 slides relative to the main body 1 to change the eyes-monitor distance A. When the adjusting component 4 pulls or pushes the monitor-base 2, the slider slides along the rail, driving the monitor-base 2 to slide relative to the main body 1, so driving the monitor 3 to slide relative to the main body 1. Since the main body 1 is fixed relative to the user's eyes 202, the monitor 3 moves closer to the user's eyes 202, thereby changing the eyes-monitor distance A, to make the visual range 2021 larger, allowing the user 200 to see the entire virtual image 31.

As shown in FIG. 1 to FIG. 3, in some embodiments, the main body 1 includes a headband 11. The headband 11 can be mounted around the head 201 of the user 200. The monitor-base 2 is movable relative to the headband 11. Since the headband 11 is fixed relative to the head 201, when the monitor-base 2 moves relative to the headband 11, the monitor-base 2 can move relative to the head 201, so the monitor 3 can move closer to the user's eyes 202, thereby changing the eyes-monitor distance A, to make the visual range 2021 larger, allowing the user 200 to see the entire virtual image 31.

As shown in FIG. 1 to FIG. 3, in some embodiments, the main body 1 includes a pad 12. The pad 12 is mounted on the headband 11. The pad 12 has a curved surface 121, and the curved surface 121 contacts the forehead of the user 200, to fix the headband 11 to the head 201 of the user 200. The monitor-base 2 is movable relative to the pad 12. When the monitor-base 2 moves relative to the pad 12 and when the monitor 3 moves relative to the eyes 202, the eyes-monitor distance A cannot be affected by the movement of the headband 11 and the pad 12 relative to the head 201, to make sure that the eyes-monitor distance A can be changed after the monitor-base 2 moves the monitor 3, so that the visual range 2021 becomes larger.

As shown in FIG. 1, the head-mounted device 100 is an augmented reality device.

As shown in FIG. 1, a head-mounted device 100 in an embodiment includes a main body 1, a monitor-base 2, and a monitor 3. The main body 1 can be worn on a head 201 of a user 200. The monitor-base 2 is movably mounted on the main body 1. The monitor 3 is movably mounted on the monitor-base 2. The monitor 3 is used for displaying a virtual image 31. A preset position is defined for the monitor 3. When the monitor 3 is moved relative to the monitor-base 2, the monitor 3 is capable of moving back towards the preset position. A visual range 2021 is defined by a range seen by the user's eyes 202 through the monitor 3, which means the visual range 2021 is the area that the user 200 sees through the monitor 3 in a certain distance. When the monitor is located on the preset position, the visual range 2021 can cover the whole virtual image 31, allowing the user 200 to see the entire virtual image 31.

In some embodiments, the head-mounted device 100 further comprises an adjusting component 4. When the monitor 3 is moved relative to the monitor-base 2, the adjusting component 4 moves the monitor 3 back towards the preset position, so the monitor 3 cannot move away from the head 201, preventing the visual range 2021 from decreasing and allowing the user 200 to see the entire virtual image 31.

In some embodiments, the adjusting component 4 is an elastic member 41. The elastic member 41 comprises two ends, one end of the elastic member 41 is connected to the main body 1, and another end of the elastic member 41 is connected to the monitor-base 2. As shown in FIG. 3, when the user 200 wears the item 300 between the user's eyes 202 and the monitor 3, and the item 300 blocks the monitor 3 causing the monitor 3 to be away from the preset position, the elastic member 41 pulls or pushes the monitor-base 2 towards the user's eyes 202, so that the monitor 3 contacts the item 300, to prevent the visual range 2021 from decreasing and allow the user 200 to see the entire virtual image 31. As shown in FIG. 2, when the user 200 wears the item 300 between the user's eyes 202 and the monitor 3 but the item 300 does not block the monitor 3, which makes that monitor 3 is located on the preset position, the elastic member 41 stays in a natural state, allowing the monitor 3 to be located on the preset position.

As shown in FIG. 1 to FIG. 3, in some embodiments, the elastic member 41 is a spring. The spring resets itself to the initial length by extending or shortening, thereby exerting elastic force on the monitor-base 2 and driving the monitor-base 2 to move while the spring resets itself. The initial length of the spring can be changed to adapt to different preset position. For example, the elastic member 41 is a tension spring, and the tension spring is located on a side of the monitor-base 2 facing the user 200. For another example, the elastic member 41 is a compression spring, and the compression spring is located on a side of the monitor-base 2 opposite to the user 200. In some other embodiments, the elastic member 41 can be a rubber piece, an elastic cord, or other components capable of elastic deformation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A head-mounted device comprising:
a main body configured for being mounted on a user's head;
a monitor-base movably mounted on the main body;
a monitor mounted on the monitor-base and configured for displaying virtual images; and
an adjusting component mounted on the monitor-base,
wherein a preset distance is defined between the user's eyes and the monitor, when an eyes-monitor distance defined between the user's eyes and the monitor is greater than the preset distance, the adjusting component moves the monitor-base towards the user's eyes;
the adjusting component is an elastic member, the elastic member comprises two ends, one of the two ends of the elastic member is connected to the main body, and another end of the two ends of the elastic member is connected to the monitor-base;
the elastic member is a tension spring, and the tension spring is located on a side of the monitor-base facing the user.

2. The head-mounted device of claim 1, wherein the elastic member is a compression spring, and the compression spring is located on a side of the monitor-base away from the user.

3. The head-mounted device of claim 1, further comprising a rotating shaft, wherein the monitor-base is connected to the main body with the rotating shaft, the monitor-base is rotatable relative to the main body to adjust the eyes-monitor distance.

4. The head-mounted device of claim 1, wherein the main body comprises a headband and the monitor-base is connected to the headband.

5. The head-mounted device of claim 4, wherein the main body further comprises a pad, the pad is connected to the headband, the pad defines a curved surface.

6. An augmented reality device comprising:
a main body configured for being mounted on a user's head;
a monitor-base movably mounted on the main body;
a monitor mounted on the monitor-base and configured for displaying virtual images; and
an adjusting component mounted on the monitor-base,
wherein a preset distance is defined between the user's eyes and the monitor, when an eyes-monitor distance defined between the user's eyes and the monitor is greater than the preset distance, the adjusting component moves the monitor-base towards the user's eyes;
the adjusting component is an elastic member, the elastic member comprises two ends, one of the two ends of the elastic member is connected to the main body, and another end of the two ends of the elastic member is connected to the monitor-base;
the elastic member is a tension spring and the tension spring is located on a side of the monitor-base facing the user.

7. The augmented reality device of claim 6, wherein the elastic member is a compression spring and the compression spring is located on a side of the monitor-base away from the user.

8. The augmented reality device of claim 6, further comprising a rotating shaft, the monitor-base is connected to the main body with the rotating shaft, wherein the monitor-base is rotatable relative to the main body to adjust the eyes-monitor distance.

9. The augmented reality device of claim 6, wherein the main body comprises a headband and the monitor-base is connected to the headband.

10. The augmented reality device of claim 9, wherein the main body further comprises a pad, the pad is connected to the headband, the pad defines a curved surface.

11. A head-mounted device comprising:
a main body configured for being mounted on a user's head;
a monitor-base mounted on the main body; and
a monitor mounted on the monitor-base and having a preset position,
wherein when the monitor is moved relative to the main body, the monitor is capable of moving back towards the preset position;
the elastic member is a tension spring, and the tension spring is located on a side of the monitor-base facing the user.

12. The head-mounted device of claim 11, further comprising an adjusting component, wherein when the monitor is moved relative to the monitor-base, the adjusting component moves the monitor back towards the preset position.

13. The head-mounted device of claim 12, wherein the adjusting component is an elastic member, the elastic member comprises two ends, one of the two ends of the elastic member is connected to the main body, and another end of the two ends of the elastic member is connected to the monitor-base.

* * * * *